United States Patent
Yu et al.

(10) Patent No.: US 8,923,772 B2
(45) Date of Patent: Dec. 30, 2014

(54) METHOD AND APPARATUS FOR CONTROLLING TRANSMISSION POWER IN WIRELESS NETWORK

(75) Inventors: Wei Yu, Toronto (CA); Tae Soo Kwon, Hwaseong-si (KR); Chang Yong Shin, Seoul (KR); Kyung Hun Jang, Suwon-si (KR); Jong Bu Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 13/088,606

(22) Filed: Apr. 18, 2011

(65) Prior Publication Data
US 2011/0319118 A1 Dec. 29, 2011

(30) Foreign Application Priority Data
Jun. 29, 2010 (KR) .................. 10-2010-0062255

(51) Int. Cl.
| | |
|---|---|
| *H04B 1/00* | (2006.01) |
| *H04W 52/40* | (2009.01) |
| *H04B 7/02* | (2006.01) |
| *H04B 7/06* | (2006.01) |
| *H04W 52/26* | (2009.01) |

(52) U.S. Cl.
CPC ............. *H04W 52/40* (2013.01); *H04B 7/024* (2013.01); *H04B 7/0617* (2013.01); *H04W 52/265* (2013.01)
USPC ........................................ 455/63.4; 455/443

(58) Field of Classification Search
USPC ............................ 455/69, 522, 443, 444, 63.4
See application file for complete search history.

(56) References Cited

U.S. PATENT DOCUMENTS

| | | | |
|---|---|---|---|
| 7,221,956 B2 | 5/2007 | Medvedev et al. | |
| 2005/0254477 A1 | 11/2005 | Lee et al. | |
| 2007/0248172 A1 | 10/2007 | Mehta et al. | |
| 2009/0042596 A1* | 2/2009 | Yavuz et al. | ................... 455/522 |
| 2009/0080356 A1 | 3/2009 | Song et al. | |
| 2009/0080360 A1 | 3/2009 | Song | |
| 2009/0086861 A1* | 4/2009 | Yavuz et al. | ................... 375/346 |
| 2009/0128410 A1 | 5/2009 | Li | |
| 2010/0041409 A1 | 2/2010 | Kim et al. | |
| 2010/0056140 A1 | 3/2010 | Hafeez | |
| 2010/0183027 A1 | 7/2010 | Mueller | |
| 2011/0115675 A1* | 5/2011 | Sanayei | ......................... 342/373 |

FOREIGN PATENT DOCUMENTS

| | | |
|---|---|---|
| KR | 10-2010-0012104 | 2/2010 |
| WO | WO-2009/075548 A1 | 6/2009 |
| WO | WO-2010/035966 A2 | 4/2010 |

OTHER PUBLICATIONS

International Search Report for International Application No. PCT/KR2011/004413 dated Jan. 2, 2012 (in English).
International Search Report issued on Jan. 4, 2012, in corresponding International Patent Application No. PCT/KR2011/004400.

* cited by examiner

*Primary Examiner* — Tu X Nguyen
(74) *Attorney, Agent, or Firm* — NSIP Law

(57) ABSTRACT

A method and apparatus for controlling transmission power in a wireless network area is provided. A target base station may control transmission power in cooperation with a neighboring base station and, thus, a satisfaction with a Quality of Service (QoS) of target terminals may be improved. Additionally, the target base station may determine whether to control the transmission power in cooperation with the neighboring base station, based on a possible improvement in satisfaction with the QoS of the target terminals.

35 Claims, 10 Drawing Sheets

METHOD AND APPARATUS FOR CONTROLLING TRANSMISSION POWER IN WIRELESS NETWORK

CROSS-REFERENCE TO RELATED APPLICATION(S)

This application claims the benefit under 35 U.S.C. §119 (a) of Korean Patent Application No. 10-2010-0062255, filed on Jun. 29, 2010, in the Korean Intellectual Property Office, the entire disclosure of which is incorporated herein by reference for all purposes.

BACKGROUND

1. Field

The following description relates to a method and apparatus for controlling transmission power in a wireless network.

2. Description of Related Art

In situations in which multiple transmitter/receiver pairs using a same frequency exist in a wireless network, interference between the multiple transmitter/receiver pairs may occur due to the amount of activity at that frequency. An attempt to limit such interference may be a primary reason to limit a capacity between multiple transmitter/receiver pairs. In particular, in a cellular environment, or in a femtocell environment that is currently gaining attention, an optimal solution for an interference problem such as this has not been yet found. Also, the interference problem is significant even in a multi-hop sensor network for a ubiquitous city (U-city) and the like. The interference in wireless communication may be attenuated by various interference control elements, such as user scheduling, beamforming, frequency resources, and controlling of transmission power. However, it is difficult to simultaneously deal with multiple ones of these interference control elements.

SUMMARY

In one general aspect, there is provided a transmission power control method of a target base station belonging to a target cell in a multi-cell environment, including calculating transmission power for the target base station by generating a transmit beamforming vector with respect to terminals corresponding to the target base station, determining to control the transmission power in cooperation with a neighboring base station belonging to a neighboring cell, and controlling the transmission power in cooperation with the neighboring base station by sharing information with the neighboring base station.

The transmission power control method may further include scheduling the terminals corresponding to the target base station based on a Proportional Fair (PF) scheduling.

The transmission power control method may further include generating the transmit beamforming vector to minimize transmission power for the target base station.

The transmit beamforming vector may be generated to achieve preset target signal ratios of the terminals corresponding to the target base station.

The preset target signal ratios may be Signal to Interference plus Noise Ratios (SINRs).

The minimized transmission power may be different from the controlled transmission power previously transmitted.

The controlled transmission power previously transmitted may be greater than the minimized transmission power.

The controlled transmission power may be a constant.

The determining may be initiated to improve a Quality of Service (QoS) of terminals.

The determining may include sending, to the neighboring base station, a request to control the transmission power in cooperation with the target base station, and receiving an acceptance response from the neighboring base station.

The determining may include receiving, from the neighboring base station, a request to cooperatively control transmission power, and sending an accept response to the neighboring base station.

The determining may be performed in response to a link for information exchange between the target base station and the neighboring base station being established.

The determining may be performed in response to there being a surplus transmission power.

The information shared with the neighboring base station may include interference price information of the target cell.

The interference price information may include interference channel state information, information regarding a satisfaction with a Quality of Service (QoS) of terminals to be scheduled, information regarding a priority of cells, or any combination thereof.

The transmission power control method may further include updating the scheduling of the terminals based on the PF scheduling.

The transmission power control method may further include updating the transmit beamforming vector using an uplink-downlink duality.

The transmission power control method may further include updating the transmit beamforming vector using a zero-forcing scheme to remove interference from the target cell.

The controlling of the transmission power in cooperation with the neighboring base station may include allocating limited transmission power different from the calculated transmission power to each transmit beam of the target base station based on the transmit beamforming vector and the shared information.

In another general aspect, there is provided a transmission power control method of a target base station belonging to a target cell in a multi-cell environment, including receiving interference price information of a neighboring cell from a neighboring base station belonging to the neighboring cell, performing scheduling of terminals corresponding to the target base station, generating a transmit beamforming vector with respect to the scheduled terminals, and allocating transmission power for the target base station to each transmit beam of the target base station based on the transmit beamforming vector and the interference price information.

The interference price information may include interference channel state information, information regarding a satisfaction with a Quality of Service (QoS) of terminals to be scheduled, information regarding a priority of cells, or any combination thereof.

The terminals corresponding to the target base station based may be scheduled on a Proportional Fair (PF) scheduling.

The transmit beamforming vector may be generated using an uplink-downlink duality.

The transmit beamforming vector may be generated using a zero-forcing scheme to remove interference from the target cell.

The transmit beamforming vector may be generated to minimize transmission power for the target base station.

The transmit beamforming vector may be generated to achieve preset target signal ratios of the terminals corresponding to the target base station.

The preset target signal ratios may be Signal to Interference plus Noise Ratios (SINRs).

The minimized transmission power may be different from the allocated transmission power.

The allocated transmission power may be greater than the minimized transmission power.

The allocated transmission power may be a constant.

The receiving, performing, generating, and allocating may be performed in a data transmission period and repeated in one or more subsequent data transmission periods.

In another general aspect, there is provided a non-transitory computer readable recording medium storing a program to cause a computer to implement the transmission power control methods.

In another general aspect, there is provided a target base station of a target cell in a multi-cell environment, including a transceiving unit configured to exchange information with a neighboring base station in a neighboring cell, and a determination unit configured to determine whether to control terminals corresponding to the target base station in cooperation with the neighboring base station based on the exchanged information.

The target base station may further include a processing unit configured to control transmission power to the terminal according to the exchanged information.

The processing unit may generate a transmit beamforming vector with respect to the terminals to minimize transmission power for the target base station.

In another general aspect, there is provided a method of controlling a target base station of a target cell in a multi-cell environment, the method including exchanging information with a neighboring base station in a neighboring cell, determining whether to control terminals corresponding to the target base station in cooperation with the neighboring base station based on the exchanged information, and controlling transmission power to the terminals according to the determining.

The method may further include controlling the transmission power to the terminals according to the exchanged information.

The exchanged information may include interference price information of the target base station.

Other features and aspects may be apparent from the following detailed description, the drawings, and the claims.

Figure 1:
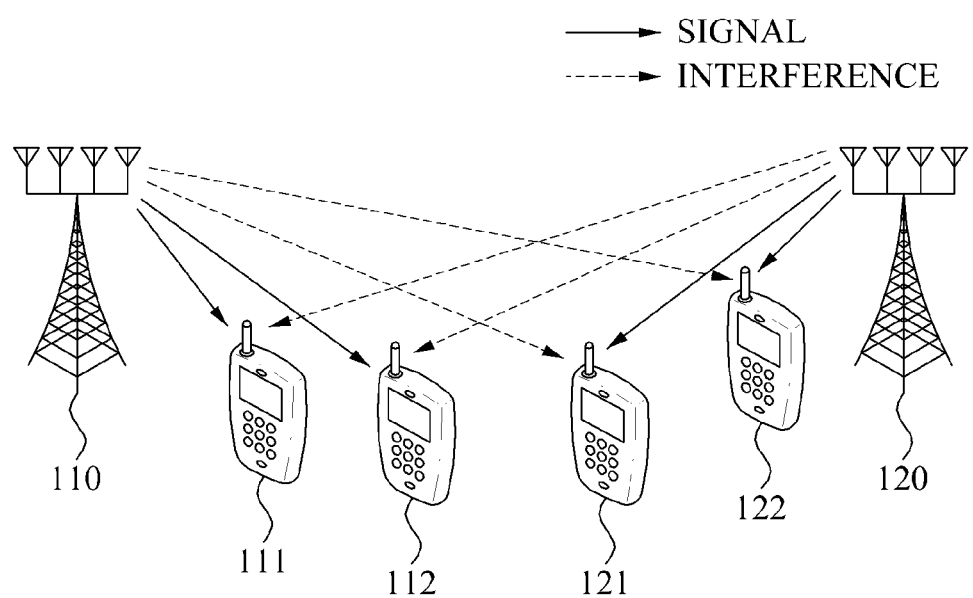
FIG. 1 is a diagram illustrating an example of a wireless communication environment in which a transmission power is controlled.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing operations described is an example; however, the sequence of operations is not limited to that set forth herein and may be changed as is known in the art, with the exception of operations necessarily occurring in a certain order. Also, description of well-known functions and constructions may be omitted for increased clarity and conciseness.

Various embodiments described herein relate to a method and apparatus for controlling transmission power to eliminate and/or reduce an interference problem in a wireless network, and may be applied to various wireless network environments that interfere with each other. The method and apparatus may be usefully used to control interference between clusters in a multi-hop communication system, such as a femtocell environment or a sensor network, as well as in a cellular system.

A cluster is similar in concept to a cell, and refers to a transceiving node set in a point-to-point transceiving relationship, or a point-to-multipoint transceiving relationship, with another transceiving node or nodes. A cluster header may function as a base station, and nodes in the cluster may function as terminals.

FIG. 1 illustrates an example of a wireless communication environment in which transmission power is controlled.

Referring to the example wireless communication environment illustrated in FIG. 1, a base station 110 may transmit data to, for example, terminals 111 and 112, and a base station 120 may transmit data to, for example, terminals 121 and 122. A signal from the base station 110 may interfere with the terminals 121 and 122 corresponding to the base station 120. Similarly, a signal from the base station 120 may interfere with the terminals 111 and 112 corresponding to the base station 110.

In a Multiple-Input Multiple-Output (MIMO) environment configured as illustrated in FIG. 1, interference may be controlled through, for example, scheduling, beamforming, controlling of transmission power, or the like. An interference control method applicable to an environment in which data is not shared between transmitter/receiver pairs may be divided into the following two schemes:

1. Capacity Maximization

A capacity maximization scheme may maximize a capacity in an example in which a user set is provided in advance, under power constraints. The capacity maximization scheme may optimize degrees of freedom using an interference alignment.

2. Power Minimization

A power minimization scheme may minimize a transmission power in an example in which a user set and a target Signal to Interference plus Noise Ratio (SINR) are set in advance. By minimizing the transmission power of transmissions such as, for example, from the base station 110 to the terminals 111 and 112, less interference will be caused to the terminals 121 and 122 by those transmissions. The power minimization scheme may derive an optimal solution using a convex optimization.

In an example in which a target SINR is provided in an environment in which a transmitter/receiver pair is set, a transmit beamforming vector for minimizing transmission power may be searched for. The transmitter/receiver pair refers to a scheduled user set. However, the method may relate to a situation in which the transmitter/receiver pair and the target SINR are fixed. Accordingly, a wireless environment such as a point-to-multipoint environment may require user scheduling. Additionally, a metric of satisfaction of an actual user, namely a user utility, may be determined based on various elements such as a capacity, a delay time, and the like, instead of a simple form such as a target SINR. Thus, various embodiments may provide a scheme of collectively managing scheduling, a frequency resource, a transmit beam, transmission power, or a combination of any of these and the like, to efficiently control interference.

Figure 2:
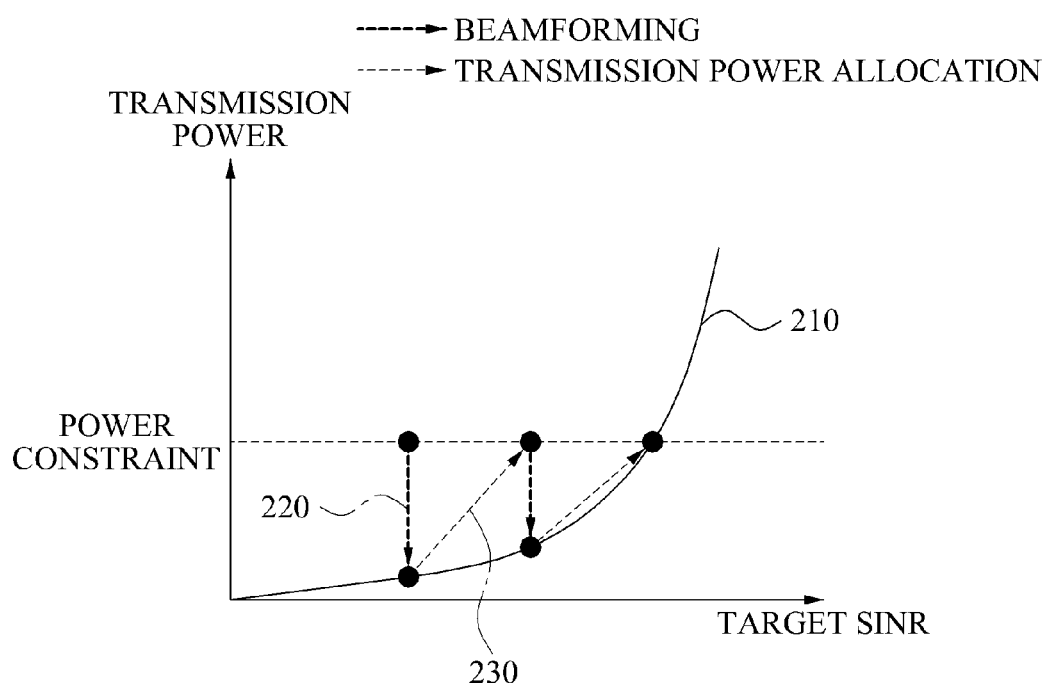
FIG. 2 is a graph illustrating an example of a scheme of deriving an optimal SINR under a limited transmission power.

FIG. 2 illustrates an example of a scheme of deriving an optimal SINR under limited transmission power.

Referring to the example of FIG. 2, the scheme of deriving the optimal SINR under the limited transmission power may be performed, for example, by repeating two operations.

In a case in which a predetermined target SINR is given, a base station may generate a transmit beamforming vector for minimizing transmission power while still achieving the target SINR in operation 220.

In an example in which the transmit beamforming vector is generated in operation 220, the base station may allocate the transmission power in cooperation with a neighboring cell, or with a neighboring cluster, based on interference between cells, using surplus power corresponding to a difference between the limited transmission power and the minimized transmission power, so that a user utility may be improved in operation 230. Accordingly, an improved target SINR may be obtained through operation 230.

Thus, it is possible to generate a beam satisfying a maximum target SINR under the limited transmission power by repeating operations 220 and 230 one or more times until the maximum target SINR is achieved.

Additionally, in an example in which an uplink-downlink duality is used in a Time-Division Duplex (TDD) environment, there is no need to exchange information between cells during generation of a transmit beamforming vector for minimizing transmission power, such as in operation 220.

In a case in which an operation of allocating transmission power for improving a user utility, such as, for example, operation 230, is performed in a parallel frequency resource environment such as an Orthogonal Frequency-Division Multiple Access (OFDMA), the transmission power may be allocated based on interference price information regarding an interference price of the neighboring cell, thereby reducing complexity of a system and effectively controlling interference. Since operation 230 requires the sharing of information between cells to improve the user utility, operation 220 may be considered to be more advantageous in implementation than operation 230.

Operation 220 may be defined as an 'individual transmission power control mode', and an operation including operations 220 and 230 may be defined as a 'cooperative transmission power control mode'. In an example in which the target SINR is enough to satisfy the user utility, the base station may be operated in the 'individual transmission power control mode'. Additionally, in a case in which it is determined that transmission power is required to be increased or reallocated due to various causes such as, for example, an increase in load, an addition of a transmitting/receiving end, a decrease in SINR caused by a change in wireless environment, or the like, the base station may be shifted to the 'cooperative transmission power control mode', and may improve the user utility through information exchange between cells. Additionally, the base station may obtain an improved SINR by repeating operations 220 and 230 one or more times. A change in mode may be performed by cooperation between cells.

An example of the user utility may be represented by Equation 1 below. In particular, when α is set to be '1', a Proportional Fair (PF) scheduling may be performed. The embodiments may be designed based on the PF scheduling.

$$U(R) = \begin{cases} \frac{1}{1-\alpha} R^{1-\alpha}, & \alpha \neq 1 \\ \log(R_1), & \alpha = 1 \end{cases}$$ [Equation 1]

Figure 3:
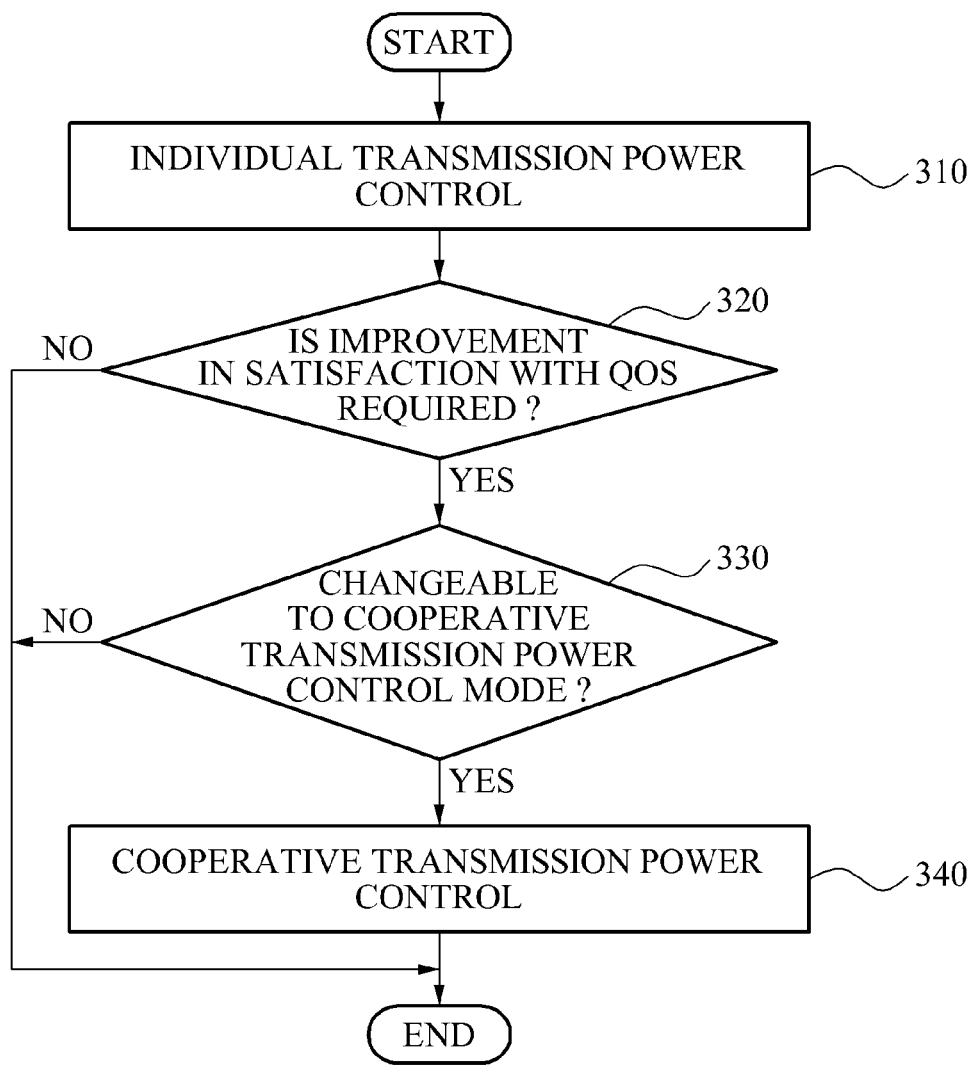
FIG. 3 is a flowchart illustrating an example of a method by which a target base station controls transmission power.

FIG. 3 illustrates an example of a method by which a target base station controls transmission power by changing an individual transmission power control mode to a cooperative transmission power control mode based on a user satisfaction with a Quality of Service (QoS) of terminals. In other words, the target base station may request that a base station of a neighboring cell join in the cooperative transmission power control mode in order to improve the QoS of the terminals communicating with the respective base stations.

Referring to FIG. 3, in operation 310, the target base station may be operated in the individual transmission power control mode. The individual transmission power control mode may enable generating of a transmit beamforming vector for minimizing a transmission power while achieving a target SINR, as described above, without any cooperative process with the base station of the neighboring cell.

In operation 320, the target base station may determine whether an improvement in the satisfaction with the QoS of the terminals is required, in the individual transmission power control mode. In this example, the satisfaction with the QoS of the terminals may refer to a utility of the terminals. More specifically, in operation 320, the target base station may receive information regarding the satisfaction with the QoS from the terminals, and may determine whether an improvement in the satisfaction with the QoS is required, based on a wireless environment change such as, for example, a channel change or an increase in interference, or based on an increase in load, or the like.

In an example in which an improvement in the satisfaction with the QoS is not required, the target base station may continue to be operated in the individual transmission power control mode since the QoS is at a satisfactory level. In a next data transmission period, the target base station may again determine whether an improvement in the satisfaction with the QoS is required.

In an example in which the QoS is not at a satisfactory level, and an improvement in the satisfaction with the QoS is required, the target base station may determine whether it is possible to change the individual transmission power control mode to the cooperative transmission power control mode in operation 330. As described above, in the cooperative transmission power control mode, the transmission power may be allocated so that the user utility may be improved, in a case in which a target SINR is given in advance and an available transmission power is limited. A possibility, or lack thereof, of a change to the cooperative transmission power control mode may be determined, for example, based on a state of a link for information exchange between the target base station and a neighboring base station, or based on whether a surplus transmission power exists in the target base station. Additionally, the possibility of the change to the cooperative transmission power control mode may be determined by cooperation between the target base station and the neighboring base station. More specifically, the target base station may send, to the neighboring base station, a request to cooperatively control the transmission power, and may receive a response to the request from the neighboring base station.

In an example in which it is impossible to change the individual transmission power control mode to the cooperative transmission power control mode, the target base station may continue to be operated in the individual transmission power control mode. In the next data transmission period, the target base station may again determine whether it is possible to change the individual transmission power control mode to the cooperative transmission power control mode. In other words, in the next data transmission period, the target base station may again send a request to the neighboring base station to cooperatively control the transmission power.

Conversely, in an example in which it is possible to change the individual transmission power control mode to the cooperative transmission power control mode, the target base station may be changed to operate in the cooperative transmission power control mode in operation 340. Cooperative control of the transmission power may be repeatedly performed to improve the user utility. Operations of the target base station in the cooperative transmission power control mode will be further described below.

Figure 4:
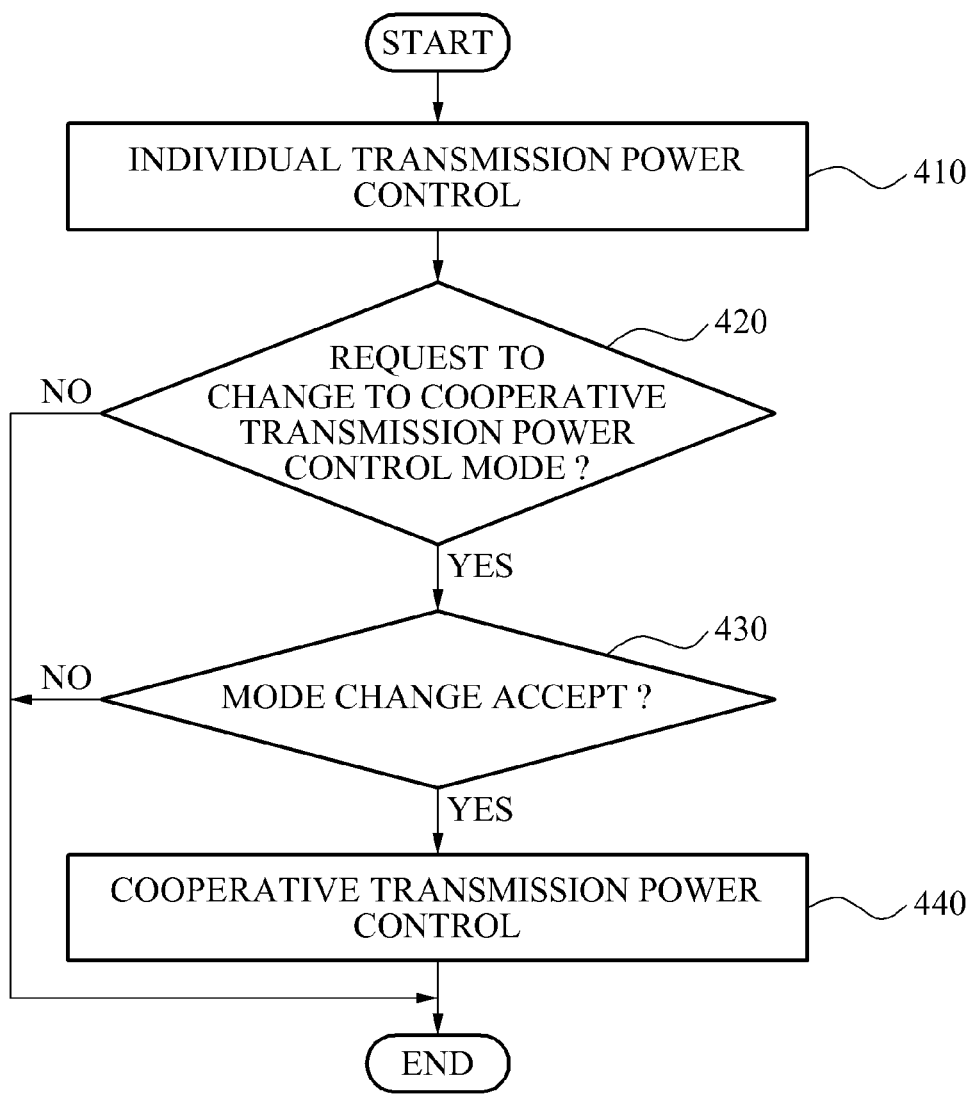
FIG. 4 is a flowchart illustrating an example of a method by which a target base station controls transmission power in response to a request of a neighboring base station.

FIG. 4 illustrates an example of a method by which a target base station controls transmission power by changing from an individual transmission power control mode to a cooperative transmission power control mode, in response to a request of a neighboring base station.

In other words, in the example of FIG. 4, the target base station may receive a request to cooperatively control the transmission power from the neighboring base station, as opposed to the example illustrated in FIG. 3, in which a target base station sends a request to cooperatively control the transmission power to a neighboring base station.

Referring to FIG. 4, in operation 410, the target base station may be initially operated in the individual transmission power control mode.

In operation 420, the target base station may determine whether a request to cooperatively control the transmission power is received from the neighboring base station.

In an example in which no request is received from the neighboring base station, the target base station may continue to be operated in the individual transmission power control mode. Conversely, in an example in which the request is received from the neighboring base station, the target base station may determine whether to change the individual transmission power control mode to the cooperative transmission power control mode, and thereby may switch modes to control the transmission power in cooperation with the neighboring base station in operation 430. The target base station may determine whether to accept the request, based on, for example, whether an improvement of a satisfaction with a QoS of terminals in a target cell is required, or whether a surplus transmission power exists in the target cell.

In an example in which the target base station determines to reject the request, the target base station may continue to be operated in the individual transmission power control mode. Conversely, in an example in which the target base station determines to accept the request, the target base station may switch modes so as to control the transmission power in cooperation with the neighboring base station, in the cooperative transmission power control mode, in operation 440. Operations of the target base station in the cooperative transmission power control mode will be further described below.

Figure 5:
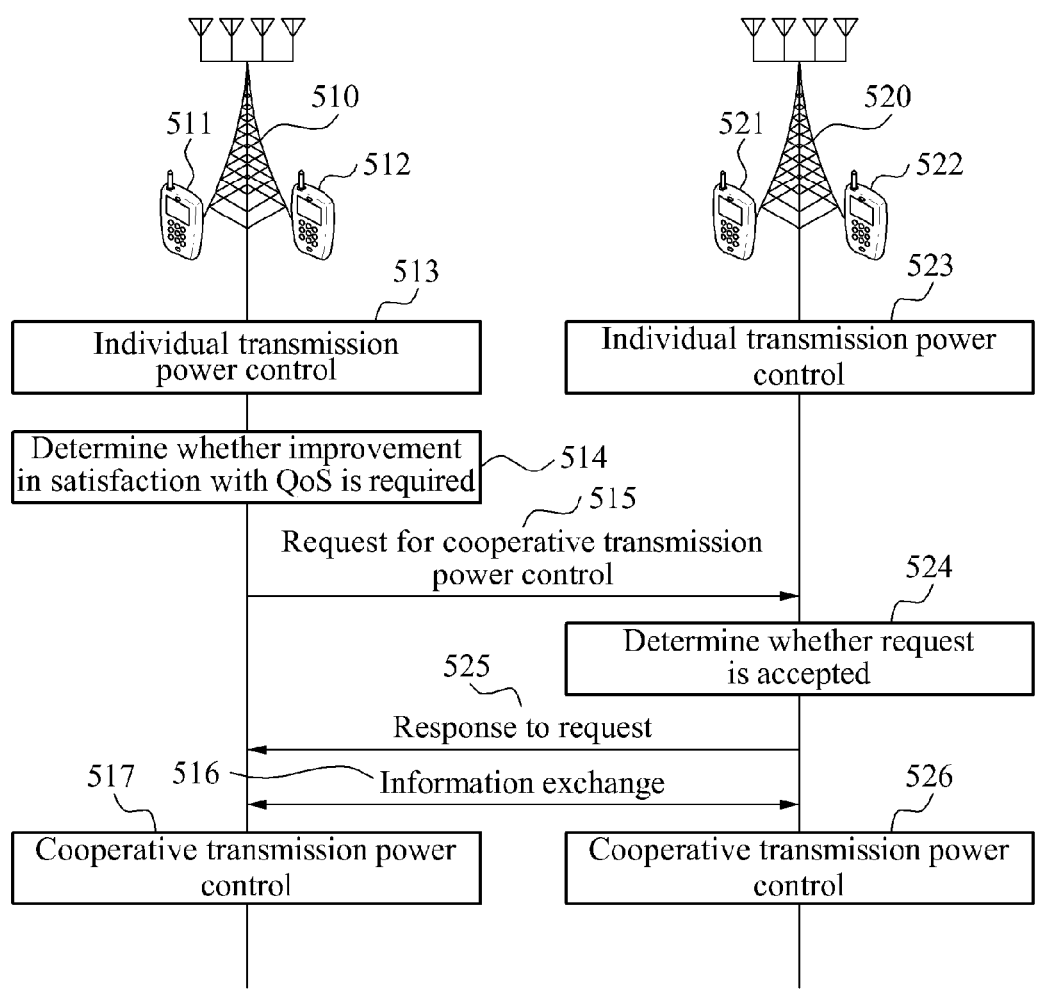
FIG. 5 is a flowchart illustrating an example of a scheme by which a target base station and a neighboring base station change interference control modes.

FIG. 5 illustrates an example of a scheme by which a target base station and a neighboring base station change interference control modes.

Referring to FIG. 5, a target cell may include a target base station 510, and terminals 511 and 512 corresponding to the target base station 510. Additionally, a neighboring cell may include a neighboring base station 520, and terminals 521 and 522 corresponding to the neighboring base station 520. As previously discussed in regard to a similar configuration in FIG. 1, transmissions from the target bases station 510 may cause interference with terminals 521 and 522, and transmissions from the neighboring base station 520 may cause interference with terminals 511 and 512.

In operations 513 and 523, the target base station 510 and the neighboring base station 520 may each be initially operated in the individual transmission power control mode.

In operation 514, the target base station 510 may determine whether an improvement in satisfaction with a QoS of the terminals 511 and 512 is required. In other words, the target base station 510 may determine whether the QoS of the terminals 511 and 512 is below a minimum satisfactory level.

In an example in which it is determined that an improvement in satisfaction with the QoS of the terminals 511 and 512 is required, the target base station 510 may send a request to cooperatively control the transmission power to the neighboring base station 520 in operation 515. The target base station 510 and the neighboring base station 520 may be connected to each other using, for example, a backhaul, a cable, or the like, or may communicate in any of a variety of wireless configurations.

In operation 524, the neighboring base station 530 may determine whether to accept the request of the target base station 510. In operation 525, the neighboring base station 520 may notify the target base station 510 of acceptance or rejection of the request of the target base station 510.

In an example in which the neighboring base station 520 determines to accept the request of the target base station 510, the target base station 510 and the neighboring base station 520 may exchange information for improving a utility of the terminals 511, 512, 521, and 522 in operation 516. The information may include, for example, interference price information regarding an increase or decrease in utility of neighboring cells based on an increase in transmission power for each frequency, and/or other such information.

In operations 517 and 526, the target base station 510 and the neighboring base station 520 may be switched to the cooperative transmission power control mode based on the exchanged information, and may cooperatively control the transmission power, so that the satisfaction with the QoS may be improved.

Individual Transmission Power Control Mode

Figure 6:
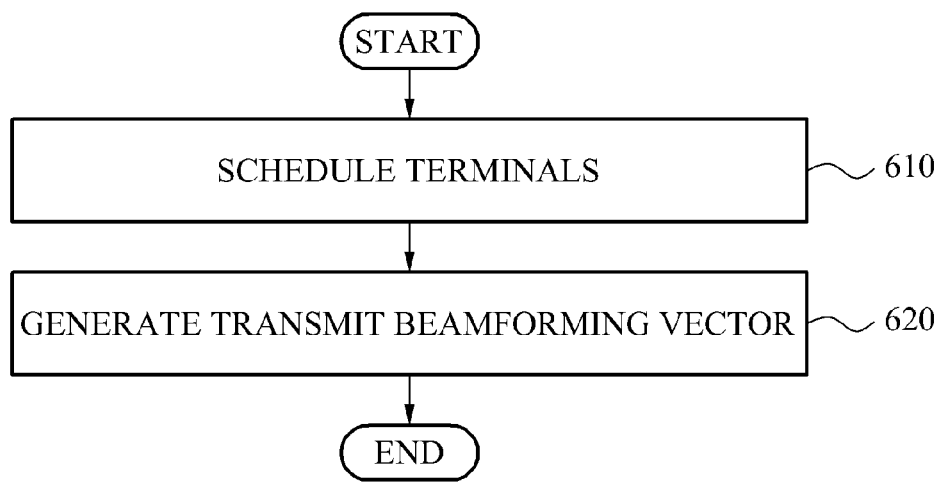
FIG. 6 is a flowchart illustrating an example of a method by which a target base station controls transmission power in an individual transmission power control mode.

FIG. 6 illustrates an example of a method by which a target base station controls transmission power in an individual transmission power control mode.

The individual transmission power control mode may be associated with coordinated beamforming.

Referring to FIG. 6, the target base station may schedule terminals corresponding to the target base station, such as the terminals 511 and 512 corresponding to the target base station 510 in FIG. 5, in the individual transmission power control mode in operation 610. More specifically, the target base station may schedule the terminals based on PF scheduling. The target base station may perform PF scheduling on each transmit beam and each sub-channel.

In operation 620, the target base station may generate a transmit beamforming vector that uses minimum power while achieving preset target signal ratios, such as SINRs, of the scheduled terminals.

To generate the transmit beamforming vector, an uplink-downlink duality may be used.

More specifically, in an interference channel environment, a transmit beam in a target cell may interface with a neighboring cell. Accordingly, a problem of determining a transmit beam of each cell may include a correlation between cells. Conversely, in a case in which only a transmit beam is determined, a receive beam may be determined by each terminal and, accordingly, interference problems may be separated for each cell. In other words, a problem of generating a receive beam may be easily solved, in comparison to to a problem of generating a transmit beam. Accordingly, a downlink problem may be converted into a virtual uplink problem, an uplink receive beam may be obtained, and the uplink receive beam may be utilized as a downlink transmit beam. For example, in an example in which the uplink-downlink duality is used, a problem involving Equation 2 may be converted into a problem involving Equation 3, and the converted problem may be more easily solved.

$$\min \sum_{ij} w_{ij}^H w_{ij}$$ [Equation 2]

$$\text{s.t.} \frac{|w_{ij}^H h_{iij}|^2}{\sum_{l \neq j} |w_{il}^H h_{iij}|^2 + \sum_{m \neq i,n} |w_{mn}^H h_{mij}|^2 + \sigma^2} \geq \gamma_{ij}$$

$$\min \sum_{ij} P_{ij} \sigma^2$$ [Equation 3]

$$\text{s.t.} \frac{P_{ij}|w_{ij}^H h_{iij}|^2}{\sum_{(m,l) \neq (i,j)} P_{ml}|w_{ij}^H h_{iml}|^2 + w_{ij}^H w_{ij}} \geq \gamma_{ij}$$

In Equations 2 and 3, $w_{ij}$ denotes a scheduling weighting value of a j-th terminal in an i-th cell, $h_{mij}$ denotes a channel from an m-th base station to a j-th terminal in an i-th cell, $P_{ij}$ denotes a transmission power of an i-th base station with respect to a j-th terminal. $\sigma^2$ denotes noise, and $\gamma_{ij}$ denotes a target SINR given to a j-th terminal in an i-th cell.

The target base station may repeatedly perform scheduling of terminals and generating of a transmit beamforming vector, in one or more subsequent data transmission periods.

Cooperative Transmission Power Control Mode

Figure 7:
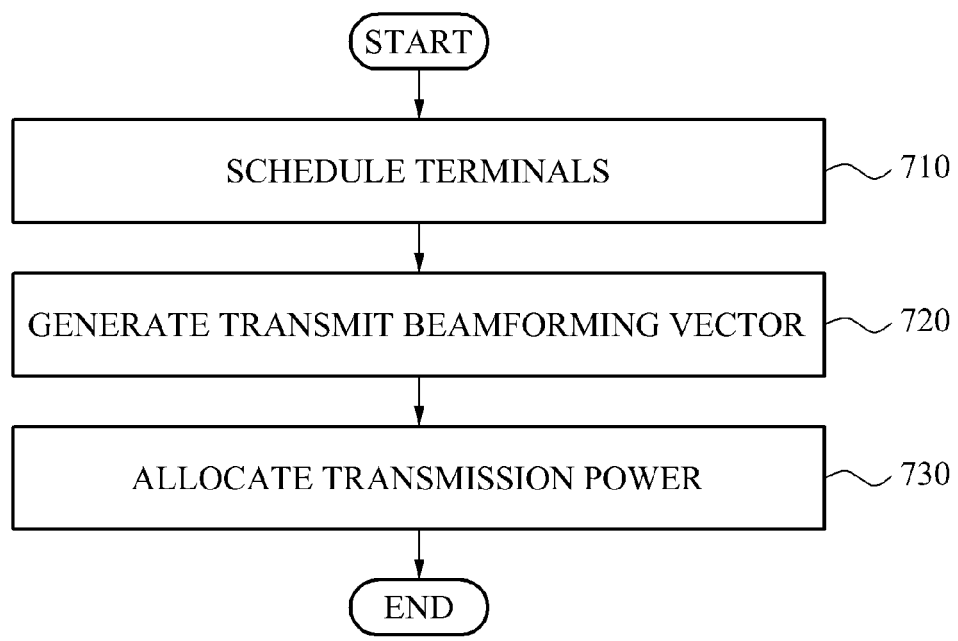
FIG. 7 is a flowchart illustrating an example of a method by which a target base station controls transmission power in a cooperative transmission power control mode.

FIG. 7 illustrates an example of a method by which a target base station controls transmission power in a cooperative transmission power control mode.

The cooperative transmission power control mode may be associated with, for example, coordinated beamforming, and Dynamic Spectrum Management (DSM).

In operation 710, the target base station may schedule terminals corresponding to the target base station, such as the terminals 511 and 512 corresponding to the target base station 510 in FIG. 5.

In operation 720, the target base station may generate a transmit beamforming vector that uses minimum power while achieving preset target SINRs of the scheduled terminals.

In operation 730, the target base station may allocate the transmission power so that a satisfaction with a QoS of the terminals may be improved. The target base station may repeatedly perform operations 710 through 730 in one or more subsequent data transmission periods.

To further describe the cooperative transmission power control mode, a system model may be assumed as discussed herein. In a multi-cell environment, each cell may transceive data using a Multi-User Multiple-Input Multiple-Output (MU-MIMO). The utility of terminals may be assumed as a log utility function that is a PF scheduling. Additionally, the terminals may be separated by beamforming. While a downlink is mainly described, each scheme may also be applied to an uplink.

The cooperative transmission power control mode may maximize a log utility function for all terminals.

In the multi-cell environment, an interference control problem may be summarized by the following Equation 4:

$$\max \sum_{l,s,k} \log(\overline{R}_{D,lsk})$$ [Equation 4]

$$\text{s.t. } R_{D,lsk} = \sum_{(b,n)|k=f_D(l,s,b,n)} \log\left(1 + \frac{P_{D,lsb}^n |(u_{lsk}^n)^T H_{ls,lsb}^n v_{lsb}^n|^2}{\Gamma\left(\sigma^2 + \sum_{(j,t,c) \neq (l,s,b)} P_{D,jtc}^n |(u_{lsk}^n)^T H_{jt,lsk}^n v_{jtc}^n|^2\right)}\right)$$

In Equation 4, $0 \leq P_{D,lsb}^n \leq S_D^{max}$ $\forall$ l, s, b, n. Here, l, s, b, k, and n respectively denote a cell, a sector, a beam, a terminal, and a frequency. More specifically, k may be f(l, s, b, n), and k may denote an optimal terminal for each cell, each sector, each beam, and each frequency. Additionally, $v_{lsb}^n$, and $u_{lsk}^n$ respectively denote a transmit beamforming vector, and a receive beamforming vector. $P_{lsb}^n$ denotes a power level for each beam. $R_{lsk}$ denotes an instantaneous transmit rate, and $\overline{R}_{lsk}$ denotes an average transmit rate. In addition, H denotes a channel.

The interference control problem of Equation 4 may include three sub-problems such as scheduling, beamforming, and transmission power allocation. Since it may be difficult to simultaneously solve the three sub-problems, the three sub-problems may be separated as shown in Table 1 below. In Table 1, it is possible to solve the interference control problem by repeating an operation of fixing two of the sub-problems and solving the other sub-problem.

TABLE 1

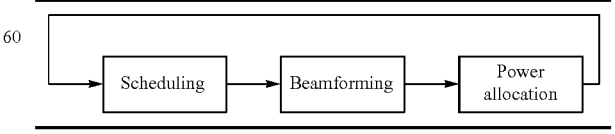

1. Scheduling

The log utility function for the average transmit rate in Equation 4 may be converted into a weighted sum rate for the instantaneous transmit rate. The weighted sum rate may be represented by the following Equation 5. The scheduling of terminals may be performed based on Equation 5.

$$f_D(l, s, b, n) = \mathrm{argmax}_k \frac{R^n_{D,lsk}}{\overline{R}_{D,lsk}} \quad \text{[Equation 5]}$$

In other words, a PF index for each transmit beam may be calculated, and scheduling may be performed for each beam of each sub-carrier. The PF index refers to 'instantaneous transmit rate/average transmit rate'. Such a scheme described above may be used to simplify the scheduling problem, and another scheme may be applied.

In an example of an uplink, a principle of Equation 5 may also be applied based on the uplink.

In an example in which a full buffer model is assumed to maximize an uplink-downlink duality effect in a TDD, an uplink terminal set may be determined as a downlink terminal set, as shown in Equation 6.

$$f_D(l,s,b,n) = f_U(l,s,b,n) \quad \text{[Equation 6]}$$

D and U respectively denote a downlink and an uplink.

2. Beamforming

In a case in which the scheduling of terminals is completed, the target base station may perform transmit beamforming. The target base station may generate a transmit beamforming vector based on the scheduled terminals, and a target SINR. More specifically, the target base station may generate a transmit beamforming vector that uses minimum power while achieving preset target SINRs of the scheduled terminals corresponding to the target base station. A receive beamforming operation may be performed using a Minimum Mean Square Error (MMSE) scheme. Additionally, a transmit beamforming operation may be performed using the uplink-downlink duality.

In an example in which the uplink-downlink duality is used, a global optimal solution may be obtained in a multi-cell Multiple-Input Single-Output (MISO) system. However, in the multi-cell MIMO system, a transmit beamforming vector or a receive beamforming vector may be iteratively updated and, accordingly, a local optimal solution may be obtained.

3. Power Allocation

In a case in which a terminal set is determined by the scheduling and the transmit beam is determined through the above-described schemes, the target base station may allocate power to each transmit beam so that the satisfaction with the QoS of terminals may be improved.

In response to the scheduled terminal set and the transmit beam being determined, a power allocation problem may be converted into a power allocation problem in a multi-cell Single-Input Single-Output (SISO) system. For example, in an example in which a transmit beam is determined, a MIMO system may be divided into a plurality of SISO systems, and a power allocation problem in the MIMO system may be converted to a power allocation problem in the SISO systems.

The target base station may determine, for each sub-carrier, a maximum available power for a transmission operation. The maximum power for each sub-carrier may be equally determined, or may be determined using a predetermined reference.

Additionally, the target base station may apply an interference pricing scheme based on interference price information exchanged with a neighboring base station, and may allocate power to each transmit beam, so that the satisfaction with the QoS of terminals may be improved. The interference price information may be associated with an increase or decrease in a utility of neighboring cells based on an increase in transmission power for each frequency. The interference price information may include, for example, interference channel state information, information regarding a satisfaction with a QoS of terminals to be scheduled, information regarding a priority of cells, or the like. The priority of cells may refer to a priority of static cells or dynamic cells.

The following Equation 7 may represent examples of the interference price information.

$$(|h_{ljk'}^n|^2/|h_{ljk'}^n|^2), P_{D,j}^n, \mathrm{SINR}_{D,j}^n \quad \text{[Equation 7]}$$

In Equation 7, $h_{ljk'}$ denotes a channel from the l-th base station to the k'-th terminal in the j-th cell.

The following Equation 8 may represent examples of interference price.

$$t_{D,jl}^n = -\left(v_{D,j} \cdot w_{D,jk'} \cdot \frac{\partial R_{jk'}^n}{\partial P_{D,l}^n}\right) \quad \text{[Equation 8]}$$

In Equation 8, $v_{D,j}$ denotes a priority of a j-th cell, and $w_{D,jk'}$ denotes a scheduling weighting value of a k'-th terminal in a j-th cell. In other words, $w_{D,jk'}$ means 'instantaneous transmit rate $R_{jk'}^n$/average transmit rate $\overline{R}_{lsk}$'. Additionally, $P_{D,l}^n$ denotes a transmission power of an l-th base station with respect to an n-th sub-channel.

The target base station may use Newton's Method to search for a direction of power control. Additionally, the target base station may simplify a problem using Diagonal Hessian Heuristics.

In an example in which the transmission power is allocated to each transmit beam as described above, a target SINR may be updated. The target base station may update average transmit rates $\overline{R}_{D,lsk}$ of terminals. In the next data transmission period, the target base station may repeatedly perform a process of the scheduling, the beamforming, and the power allocation, based on the updated target SINR and the updated average transmit rates $\overline{R}_{D,lsk}$. In an example in which the process is continuously repeated, the satisfaction with the QoS may be maximized under the limited transmission power.

In other words, in the cooperative transmission power control mode, the target base station may generate the transmit beamforming vector using the minimum power with respect to the target SINRs in operation 720, and may allocate remaining power to each beam so that the SINRs may be increased in operation 730. Additionally, the local optimal solution may be acquired by repeating operations 720 and 730 one or more times. Such a method may be separately applied to each frequency.

Figure 8:
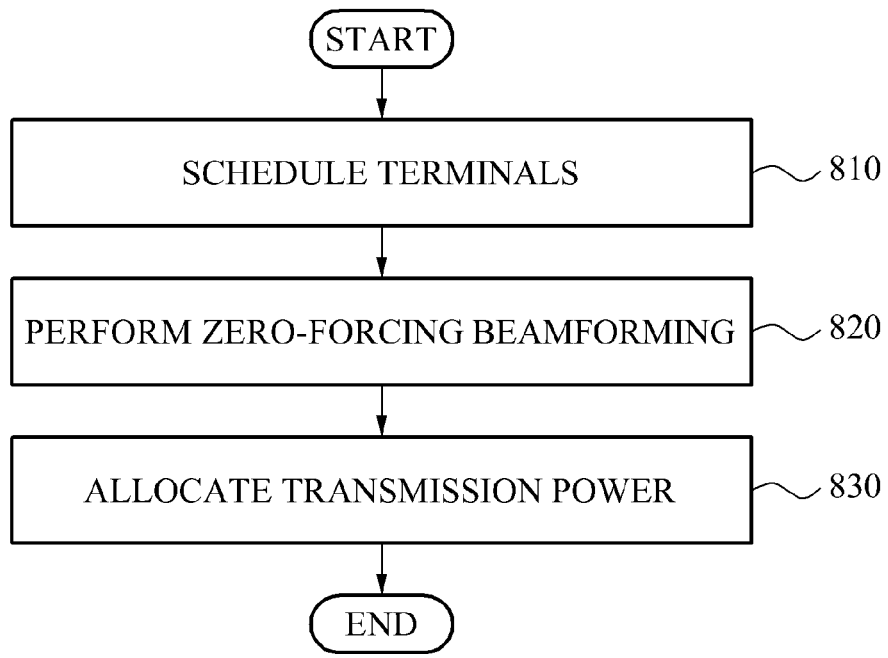
FIG. 8 is a flowchart illustrating another example of a method by which a target base station controls transmission power in a cooperative transmission power control mode.

FIG. 8 illustrates another example of a method by which a target base station controls transmission power in a cooperative transmission power control mode.

Referring to FIG. 8, in operation 810, the target base station may schedule terminals corresponding to the target base station.

In operation 820, the target base station may perform zero-forcing beamforming to remove one or more instances of interference occurring within a target cell. In this example, the zero-forcing beamforming may be performed regardless of an interference between cells.

In operation 830, the target base station may allocate the transmission power so that a satisfaction with a QoS of the terminals may be improved.

Operation 810 and 830 of the method of FIG. 8 may be substantially similar to operations 710 and 730 of the method of FIG. 7 and, accordingly, further descriptions of the method of FIG. 8 will be omitted herein.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Figure 9:
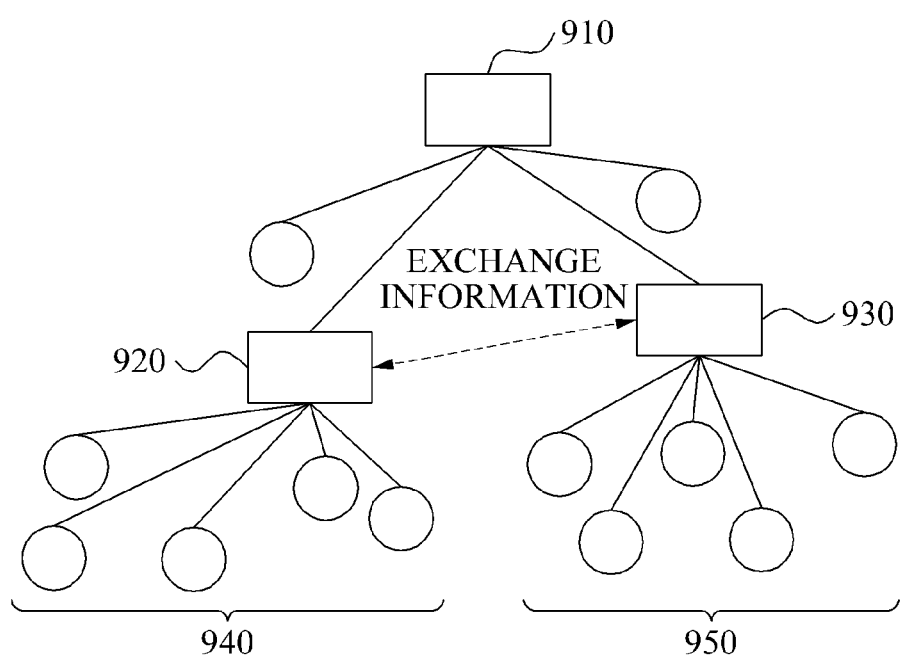
FIG. 9 is a diagram illustrating an example of a sensor network to which a transmission power control method is applicable.

FIG. 9 illustrates an example of a sensor network to which a transmission power control method is applicable.

The transmission power control method may be applied to the sensor network of FIG. 9.

Referring to FIG. 9, the sensor network may include a sink 910, intermediate agents 920 and 930, and sensors 940 and 950.

The sink 910 may collect information from the intermediate agents 920 and 930. Alternatively, the sink 910 may be connected to the sensors 940 and 950 directly without using the intermediate agents 920 and 930.

The intermediate agents 920 and 930 may be connected to the sensors 940 and 950. The intermediate agents 920 and 930 may function as intermediate data processors such as, for example, a compressed sensing recovery. The intermediate agents 920 and 930 may be operated in a similar manner to base stations. Accordingly, in response to a cooperative transmission power control being required, information may be exchanged between the intermediate agents 920 and 930.

The sensors 940 and 950 may include, for example, visual sensors. The sensors 940 and 950 may be operated in a similar manner to terminals.

Figure 10:
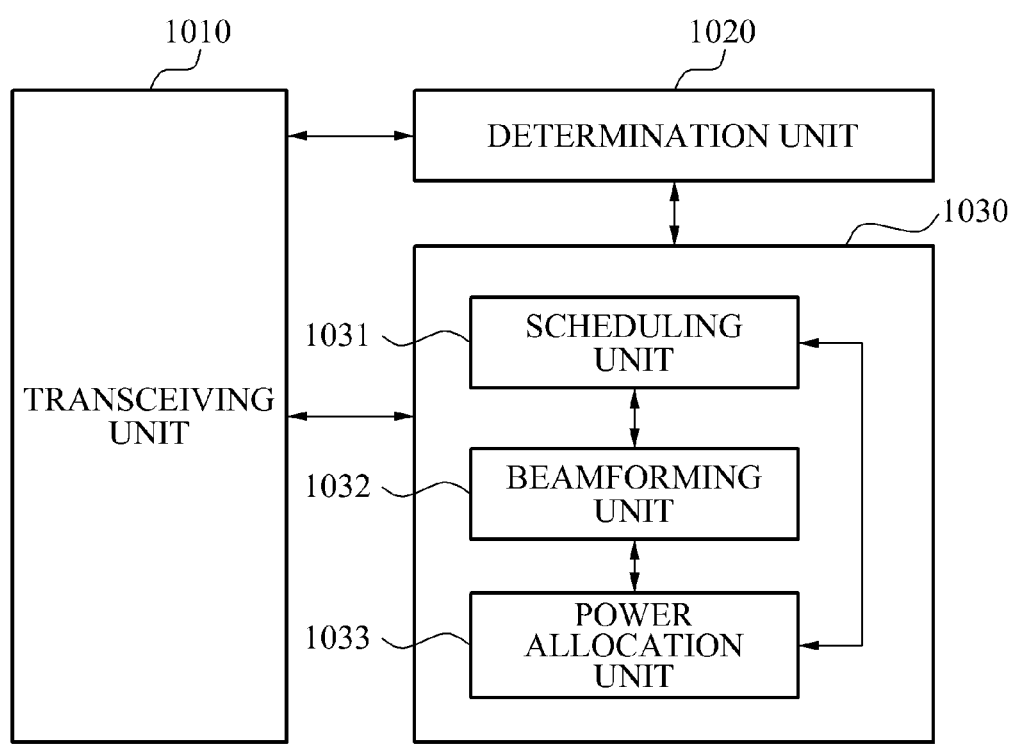
FIG. 10 is a block diagram illustrating an example of a target base station for controlling transmission power.

FIG. 10 illustrates an example of a target base station for controlling transmission power.

Referring to FIG. 10, the target base station may include a transceiving unit 1010, a determination unit 1020, and a processing unit 1030. In various embodiments, one or more of these units may be provided on a single module.

The transceiving unit 1010 may transmit or receive data to or from terminals corresponding to the target base station, and may exchange information with a neighboring base station. Additionally, the transceiving unit 1010 may send a mode change request to the neighboring base station.

The determination unit 1020 may determine whether the target base station needs to change the individual transmission power control mode to the cooperative transmission power control mode.

The processing unit 1030 may include a scheduling unit 1031, a beamforming unit 1032, and a power allocation unit 1033. The scheduling unit 1031 may schedule terminals using a PF scheduling scheme. The beamforming unit 1032 may generate a transmit beamforming vector that uses minimum power while achieving target SINRs of the terminals. Additionally, the power allocation unit 1033 may allocate power to each transmit beam, based on limited transmission power and interference cost information exchanged with the neighboring base station, so that a satisfaction with a QoS of the terminals may be improved.

As a non-exhaustive illustration only, the terminals described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission power control method for a target base station belonging to a target cell in a multi-cell environment, the transmission power control method comprising:
    calculating transmission power for the target base station by generating a transmit beamforming vector that achieves a limited amount of allocated transmission power transmitted by the target base station while still achieving minimum target ratios with respect to terminals served by the target base station;
    determining to increase the transmission power of the target base station in cooperation with a neighboring base station belonging to a neighboring cell; and
    increasing the transmission power to the terminals served by the target base station in cooperation with the neighboring base station by sharing information with the neighboring base station,
    wherein the calculating of the transmission power and the increasing of the transmission power are repeatedly performed after achieving the minimum target ratios of the terminals to increase the ratios of the terminals to more optimal ratios using surplus power resulting from the limited amount of allocated transmission power of the target base station being greater than the minimum target ratios of the terminals.

2. The transmission power control method of claim 1, further comprising scheduling the terminals corresponding to the target base station based on a Proportional Fair (PF) scheduling.

3. The transmission power control method of claim 2, further comprising updating the scheduling of the terminals based on the PF scheduling.

4. The transmission power control method of claim 1, wherein the transmit beamforming vector is generated to achieve preset target signal ratios of the terminals corresponding to the target base station.

5. The transmission power control method of claim 4, wherein the preset target signal ratios are Signal to Interference plus Noise Ratios (SINRs).

6. The transmission power control method of claim 5, wherein the transmit beamforming vector is generated using the minimum power required by the target SINRs.

7. The transmission power control method of claim 1, wherein the minimized transmission power is different from the controlled transmission power previously transmitted.

8. The transmission power control method of claim 7, wherein the controlled transmission power previously transmitted is greater than the minimized transmission power.

9. The transmission power control method of claim 1, wherein the controlled transmission power is a constant.

10. The transmission power control method of claim 1, wherein the determining is initiated to improve a Quality of Service (QoS) of terminals.

11. The transmission power control method of claim 1, wherein the determining comprises:
    sending, to the neighboring base station, a request to control the transmission power in cooperation with the target base station; and
    receiving an acceptance response from the neighboring base station.

12. The transmission power control method of claim 1, wherein the determining comprises:
    receiving, from the neighboring base station, a request to cooperatively control transmission power; and
    sending an accept response to the neighboring base station.

13. The transmission power control method of claim 1, wherein the determining is performed in response to a link for information exchange between the target base station and the neighboring base station being established.

14. The transmission power control method of claim 1, wherein the determining is performed in response to there being a surplus of transmission power at the target base station.

15. The transmission power control method of claim 1, wherein the information shared with the neighboring base station comprises interference price information of the target cell.

16. The transmission power control method of claim 15, wherein the interference price information comprises interference channel state information, information regarding a satisfaction with a Quality of Service (QoS) of terminals to be scheduled, information regarding a priority of cells, or any combination thereof.

17. The transmission power control method of claim 1, further comprising updating the transmit beamforming vector using an uplink-downlink duality.

18. The transmission power control method of claim 1, further comprising updating the transmit beamforming vector using a zero-forcing scheme to remove interference from the target cell.

19. The transmission power control method of claim 1, wherein the controlling of the transmission power in cooperation with the neighboring base station comprises allocating limited transmission power different from the calculated transmission power to each transmit beam of the target base station based on the transmit beamforming vector and the shared information.

20. A non-transitory computer readable recording medium storing a program to cause a computer to implement the transmission power control method of claim 1.

21. The transmission power control method of claim 1, further comprising allocating remaining transmission power to a transmit beam from the neighboring base station.

22. A transmission power control method for a target base station belonging to a target cell in a multi-cell environment, the transmission power control method comprising:
    receiving interference price information of a neighboring cell from a neighboring base station belonging to the neighboring cell;
    performing scheduling of terminals corresponding to the target base station;
    generating a transmit beamforming vector with respect to the scheduled terminals that achieves a limited amount of allocated transmission power transmitted by the target base station while still achieving minimum target ratios with respect to the scheduled terminals; and
    allocating transmission power for the target base station to each transmit beam of the target base station based on the transmit beamforming vector and the interference price information,
    wherein the calculating of the transmission power and the increasing of the transmission power are repeatedly performed after achieving the minimum target ratios of the terminals to increase the ratios of the terminals to more optimal ratios using surplus power resulting from the limited amount of allocated transmission power of the target base station being greater than the minimum target ratios of the terminals.

23. The transmission power control method of claim 22, wherein the interference price information comprises interference channel state information, information regarding a satisfaction with a Quality of Service (QoS) of terminals to be scheduled, information regarding a priority of cells, or any combination thereof.

24. The transmission power control method of claim 22, wherein the terminals corresponding to the target base station are scheduled based on a Proportional Fair (PF) scheduling.

25. The transmission power control method of claim 22, wherein the transmit beamforming vector is generated using an uplink-downlink duality.

26. The transmission power control method of claim 22, wherein the transmit beamforming vector is generated using a zero-forcing scheme to remove interference from the target cell.

27. The transmission power control method of claim 22, wherein the transmit beamforming vector is generated to achieve preset target signal ratios of the terminals corresponding to the target base station.

28. The transmission power control method of claim 27, wherein the preset target signal ratios are Signal to Interference plus Noise Ratios (SINRs).

29. The transmission power control method of claim 22, wherein the minimized transmission power is different from the allocated transmission power.

30. The transmission power control method of claim 29, wherein the allocated transmission power is greater than the minimized transmission power.

31. The transmission power control method of claim 22, wherein the allocated transmission power is a constant.

32. The transmission power control method of claim 22, wherein the receiving, performing, generating, and allocating are performed in a data transmission period and repeated in one or more subsequent data transmission periods.

33. A target base station of a target cell in a multi-cell environment, the target base station comprising:
- a processor configured to calculate a transmission power for the target base station by generating a transmit beamforming vector that achieves a limited amount of allocated transmission power transmitted by the target base station while still achieving minimum target ratios with respect to terminals served by the target base station;
- a transceiving unit configured to exchange information with a neighboring base station in a neighboring cell; and
- a determination unit configured to determine to increase transmission power to the terminals served by the target base station in cooperation with the neighboring base station based on the exchanged information,
- wherein the calculating of the transmission power and the increasing of the transmission power are repeatedly performed after achieving the minimum target ratios of the terminals to increase the ratios of the terminals to more optimal ratios using surplus power resulting from the limited amount of allocated transmission power of the target base station being greater than the minimum target ratios of the terminals.

34. A method of controlling a target base station of a target cell in a multi-cell environment, the method comprising:
- calculating a transmission power for the target base station by generating a transmit beamforming vector that generates a surplus of allocated transmission power while still achieving target ratios with respect to terminals served by the target base station;
- exchanging information with a neighboring base station in a neighboring cell;
- determining to increase transmission power to the terminals served by the target base station in cooperation with the neighboring base station based on the exchanged information; and
- controlling transmission power to the terminals according to the determining,
- wherein the calculating of the transmission power and the increasing of the transmission power are repeatedly performed after achieving the minimum target ratios of the terminals to increase the ratios of the terminals to more optimal ratios using the surplus of allocated power resulting from the amount of allocated transmission power of the target base station being greater than the minimum target ratios of the terminals.

35. The method of claim 34, wherein the exchanged information comprises interference price information of the target base station.

* * * * *